US006849144B2

(12) United States Patent
Wong

(10) Patent No.: US 6,849,144 B2
(45) Date of Patent: Feb. 1, 2005

(54) METHOD FOR MAKING SWITCH WITH ULTRASONICALLY MILLED CHANNEL PLATE

(75) Inventor: Marvin Glenn Wong, Woodland Park, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 10/871,721

(22) Filed: Jun. 17, 2004

(65) Prior Publication Data

US 2005/0000620 A1 Jan. 6, 2005

Related U.S. Application Data

(62) Division of application No. 10/317,630, filed on Dec. 12, 2002.

(51) Int. Cl.[7] ................................................ B32B 31/16

(52) U.S. Cl. ....................................... 156/73.1; 156/257

(58) Field of Search .............................. 156/73.1, 73.3, 156/250, 256, 257, 272.8, 325, 580.1, 580.2

(56) References Cited

U.S. PATENT DOCUMENTS

| | | |
|---|---|---|
| 2,312,672 A | 3/1943 | Pollard, Jr. |
| 2,564,081 A | 8/1951 | Schilling |
| 3,430,020 A | 2/1969 | Tomkewitsch et al. |
| 3,529,268 A | 9/1970 | Rauterberg |

(List continued on next page.)

FOREIGN PATENT DOCUMENTS

| | | |
|---|---|---|
| EP | 0593836 A1 | 4/1994 |
| FR | 2418539 | 9/1979 |
| FR | 2458138 | 12/1980 |
| FR | 2667396 | 4/1992 |
| JP | SHO 36-18575 | 10/1961 |
| JP | SHO 47-21645 | 10/1972 |
| JP | 62-276838 | 12/1987 |
| JP | 01-294317 | 12/1988 |
| JP | 8-125487 | 5/1996 |
| JP | 9161640 A | 6/1997 |
| WO | WO99/46624 | 12/1999 |

OTHER PUBLICATIONS

TDB-ACC-NO:NB8406827, "Integral Power Resistors for Aluminum Substrate", IBM Technical Disclosure Bulletin, Jun. 1984, US, vol. 27, Issue No. 1B, p. 827.

Bhedwar, Homi C., et al. "Ceramic Multilayer Package Fabrication," Electronic Materials Handbook, Nov. 1989, pp 460–469, vol. 1 Packaging, Section 4; Packages.

Marvin Glenn Wong, "A Piezoelectrically Actuated Liquid Metal Switch", May 2, 2002, patent application (pending), 12 pages of specification, 5 pages of claims, 1 page of abstract, and 10 sheets of drawings (Figs. 1–10).

Jonathan Simon, et al., "A Liquid–Filled Microrelay with a Moving Mercury Microdrop". Journal of Microelectromechanical Systems, vol. 6, No. 3, Sep. 1977, pp. 208–216.

Joonwon Kim et al., "A Micromechanical Switch with Electrostatically Driven Liquid–Metal Droplet", Sensors and Actuators, A:Physical, v 9798, Apr. 1, 2002, 4 pages.

Marvin Glenn Wong, "Laser Cut Channel Plate for a Switch" patent application, 11 pages of specification, 5 pages of claims, and 1 page of abstract, and 4 sheets of formal drawings (Figs. 1–10).

*Primary Examiner*—James Sells

(57) ABSTRACT

Disclosed herein is a method for making a fluid-based switch having a channel plate and a switching fluid. The method comprises 1) ultrasonically milling at least one feature into a channel plate, and 2) aligning the at least one feature cut in the channel plate with at least one feature on a substrate and sealing at least a switching fluid between the channel plate and the substrate. Alternate embodiments of the invention are also disclosed.

9 Claims, 5 Drawing Sheets

U.S. PATENT DOCUMENTS

| | | | | |
|---|---|---|---|---|
| 3,600,537 | A | | 8/1971 | Twyford |
| 3,639,165 | A | | 2/1972 | Rairden, III |
| 3,657,647 | A | | 4/1972 | Beusman et al. |
| 4,103,135 | A | | 7/1978 | Gomez et al. |
| 4,200,779 | A | | 4/1980 | Zakurdaev et al. |
| 4,238,748 | A | | 12/1980 | Goullin et al. |
| 4,245,886 | A | | 1/1981 | Kolodzey et al. |
| 4,336,570 | A | | 6/1982 | Brower |
| 4,419,650 | A | | 12/1983 | John |
| 4,434,337 | A | | 2/1984 | Becker |
| 4,475,033 | A | | 10/1984 | Willemsen et al. |
| 4,505,539 | A | | 3/1985 | Auracher et al. |
| 4,582,391 | A | | 4/1986 | Legrand |
| 4,628,161 | A | | 12/1986 | Thackrey |
| 4,652,710 | A | | 3/1987 | Karnowsky et al. |
| 4,657,339 | A | | 4/1987 | Fick |
| 4,742,263 | A | | 5/1988 | Harnden, Jr. et al. |
| 4,786,130 | A | | 11/1988 | Georgiou et al. |
| 4,797,519 | A | | 1/1989 | Elenbaas |
| 4,804,932 | A | | 2/1989 | Akanuma et al. |
| 4,988,157 | A | | 1/1991 | Jackel et al. |
| 5,278,012 | A | | 1/1994 | Yamanaka et al. |
| 5,415,026 | A | | 5/1995 | Ford |
| 5,502,781 | A | | 3/1996 | Li et al. |
| 5,644,676 | A | | 7/1997 | Blomberg et al. |
| 5,675,310 | A | | 10/1997 | Wojnarowski et al. |
| 5,677,823 | A | | 10/1997 | Smith |
| 5,751,074 | A | | 5/1998 | Prior et al. |
| 5,751,552 | A | | 5/1998 | Scanlan et al. |
| 5,828,799 | A | | 10/1998 | Donald |
| 5,841,686 | A | | 11/1998 | Chu et al. |
| 5,849,623 | A | | 12/1998 | Wojnarowski et al. |
| 5,874,770 | A | | 2/1999 | Saia et al. |
| 5,875,531 | A | | 3/1999 | Nellissen et al. |
| 5,886,407 | A | | 3/1999 | Polese et al. |
| 5,889,325 | A | | 3/1999 | Uchida et al. |
| 5,912,606 | A | | 6/1999 | Nathanson et al. |
| 5,915,050 | A | | 6/1999 | Russell et al. |
| 5,972,737 | A | | 10/1999 | Polese et al. |
| 5,994,750 | A | | 11/1999 | Yagi |
| 6,021,048 | A | | 2/2000 | Smith |
| 6,180,873 | B1 | | 1/2001 | Bitko |
| 6,201,682 | B1 | | 3/2001 | Mooij et al. |
| 6,207,234 | B1 | | 3/2001 | Jiang |
| 6,212,308 | B1 | | 4/2001 | Donald |
| 6,225,133 | B1 | | 5/2001 | Yamamichi et al. |
| 6,278,541 | B1 | | 8/2001 | Baker |
| 6,304,450 | B1 | | 10/2001 | Dibene, II et al. |
| 6,320,994 | B1 | | 11/2001 | Donald et al. |
| 6,323,447 | B1 | | 11/2001 | Kondoh et al. |
| 6,351,579 | B1 | | 2/2002 | Early et al. |
| 6,356,679 | B1 | | 3/2002 | Kapany |
| 6,373,356 | B1 | | 4/2002 | Gutierrez |
| 6,396,012 | B1 | | 5/2002 | Bloomfield |
| 6,396,371 | B2 | | 5/2002 | Streeter et al. |
| 6,408,112 | B1 | | 6/2002 | Bartels |
| 6,446,317 | B1 | | 9/2002 | Figueroa et al. |
| 6,453,086 | B1 | | 9/2002 | Tarazona |
| 6,470,106 | B2 | | 10/2002 | McClelland et al. |
| 6,487,333 | B2 | | 11/2002 | Fouquet |
| 6,490,384 | B2 | * | 12/2002 | Yong ........................... 385/17 |
| 6,501,354 | B1 | | 12/2002 | Gutierrez et al. |
| 6,512,322 | B1 | | 1/2003 | Wong |
| 6,515,404 | B1 | | 2/2003 | Wong |
| 6,516,504 | B2 | | 2/2003 | Schaper |
| 6,559,420 | B1 | | 5/2003 | Zarev |
| 6,633,213 | B1 | | 10/2003 | Dove |
| 6,714,700 | B2 | * | 3/2004 | Burger et al. ................. 385/17 |
| 2002/0037128 | A1 | | 3/2002 | Burger et al. |
| 2002/0146197 | A1 | | 10/2002 | Yong |
| 2002/0150323 | A1 | | 10/2002 | Nishida et al. |
| 2002/0168133 | A1 | | 11/2002 | Saito |
| 2003/0035611 | A1 | | 2/2003 | Shi |

* cited by examiner

METHOD FOR MAKING SWITCH WITH ULTRASONICALLY MILLED CHANNEL PLATE

CROSS-REFERENCE TO RELATED APPLICATION

This is a divisional of copending application Ser. No. 10/317,630 filed on Dec. 12, 2002, which is hereby incorporated by reference herein.

BACKGROUND

Channel plates for liquid metal micro switches (LIMMS) can be made by sandblasting channels into glass plates, and then selectively metallizing regions of the channels to make them wettable by mercury or other liquid metals. One problem with the current state of the art, however, is that the feature tolerances of channels produced by sandblasting are sometimes unacceptable (e.g., variances in channel width on the order of ±20% are sometimes encountered). Such variances complicate the construction and assembly of switch components, and also place limits on a switch's size (i.e., there comes a point where the expected variance in a feature's size overtakes the size of the feature itself).

SUMMARY OF THE INVENTION

One aspect of the invention is embodied in a method for making a switch. The method comprises 1) ultrasonically milling at least one feature into a channel plate, and 2) aligning the at least one feature cut in the channel plate with at least one feature on a substrate and sealing at least a switching fluid between the channel plate and the substrate.

Other embodiments of the invention are also disclosed.

BRIEF DESCRIPTION OF THE DRAWINGS

Illustrative embodiments of the invention are illustrated in the drawings, in which.

DETAILED DESCRIPTION OF THE INVENTION

When sandblasting channels into a glass plate, there are limits on the feature tolerances of the channels. For example, when sandblasting a channel having a width measured in tenths of millimeters (using, for example, a ZERO automated blasting machine manufactured by Clemco Industries Corporation of Washington, Mo., USA), variances in channel width on the order of ±20% are sometimes encountered. Large variances in channel length and depth are also encountered. Such variances complicate the construction and assembly of liquid metal micro switch (LIMMS) components. For example, channel variations within and between glass channel plate wafers require the dispensing of precise, but varying, amounts of liquid metal for each channel plate. Channel feature variations also place a limit on the of LIMMS (i.e., there comes a point where the expected variance in a feature's size overtakes the size of the feature itself).

In an attempt to remedy some or all of the above problems, switches with ultrasonically milled channel plates, and methods for making same, are disclosed herein. It should be noted, however, that the switches and methods disclosed may be suited to solving other problems, either now known or that will arise in the future.

When channels are ultrasonically milled in a channel plate, variances in channel width for channels measured in tenths of millimeters (or smaller) can be reduced to about ±15% using the methods and apparatus disclosed herein.

Another advantage to ultrasonic milling is that channel features of varying depth can be formed at the same time (i.e., in parallel), whereas channel plate features of varying depth must be formed serially when they are sandblasted. As a result, the ultrasonic milling of channel features increases manufacturing throughput.

Figure 1:
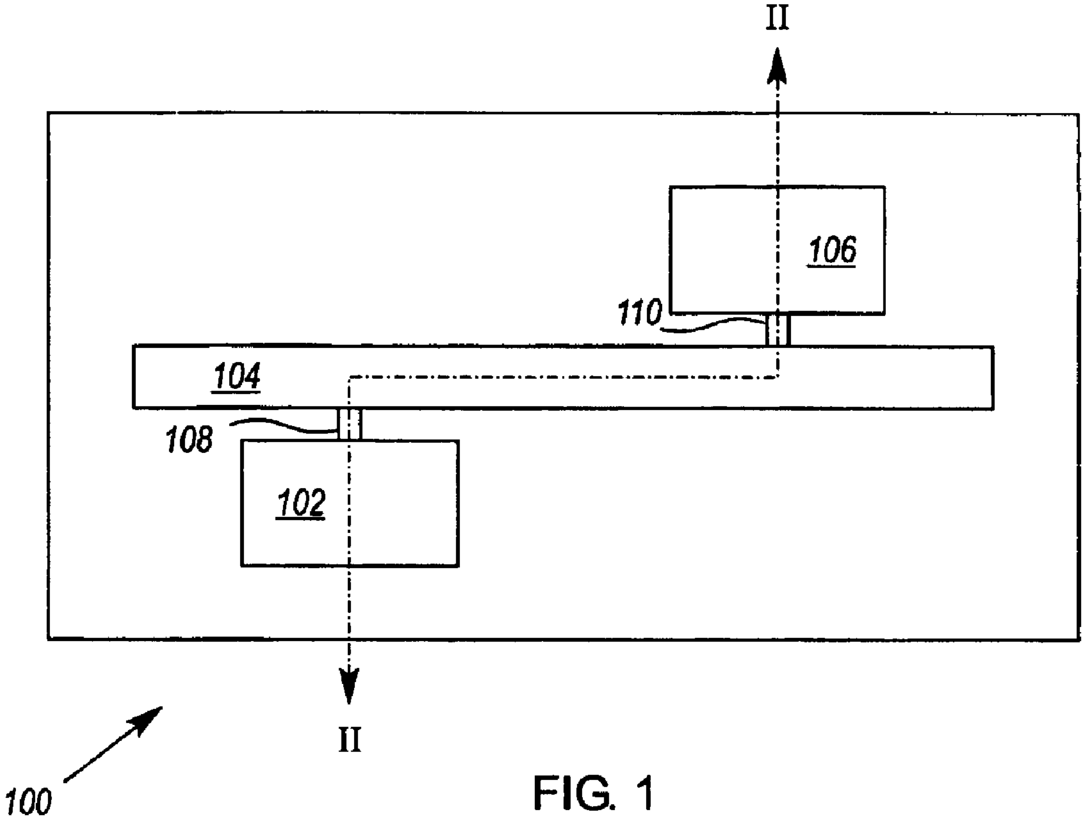
FIG. 1 illustrates an exemplary plan view of a channel plate for a switch.
Figure 2:
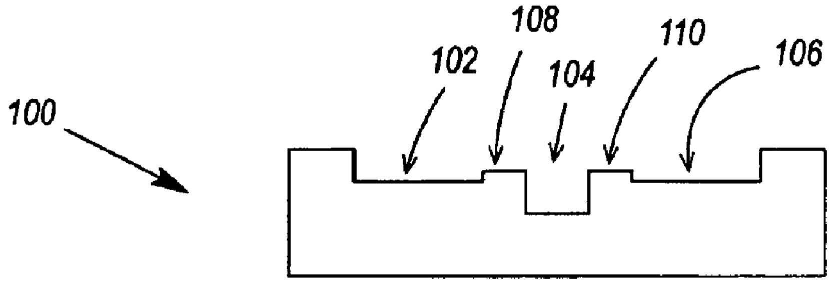
FIG. 2 illustrates an elevation view of the FIG. 1 channel plate.

FIGS. 1 & 2 illustrate a first exemplary embodiment of a channel plate 100 for a fluid-based switch such as a LIMMS. By way of example, the features that are formed in the channel plate 100 comprise a switching fluid channel 104, a pair of actuating fluid channels 102, 106, and a pair of channels 108, 110 that connect corresponding ones of the actuating fluid channels 102, 106 to the switching fluid channel 104 (NOTE: The usefulness of these features in the context of a switch will be discussed later in this description.). The switching fluid channel 104 may have a width of about 200 microns, a length of about 2600 microns, and a depth of about 200 microns. The actuating fluid channels 102, 106 may each have a width of about 350 microns, a length of about 1400 microns, and a depth of about 300 microns. The channels 108, 110 that connect the actuating fluid channels 102, 106 to the switching fluid channel 104 may each have a width of about 100 microns, a length of about 600 microns, and a depth of about 130 microns. The base material for the channel plate 100 may be glass, ceramic, metal or polymer, to name a few.

It is envisioned that more or fewer channels may be formed in a channel plate, depending on the configuration of the switch in which the channel plate is to be used. For example, and as will become more clear after reading the following descriptions of various switches, the pair of actuating fluid channels 102, 106 and pair of connecting channels 108, 110 disclosed in the preceding paragraph may be replaced by a single actuating fluid channel and single connecting channel.

Figure 3:
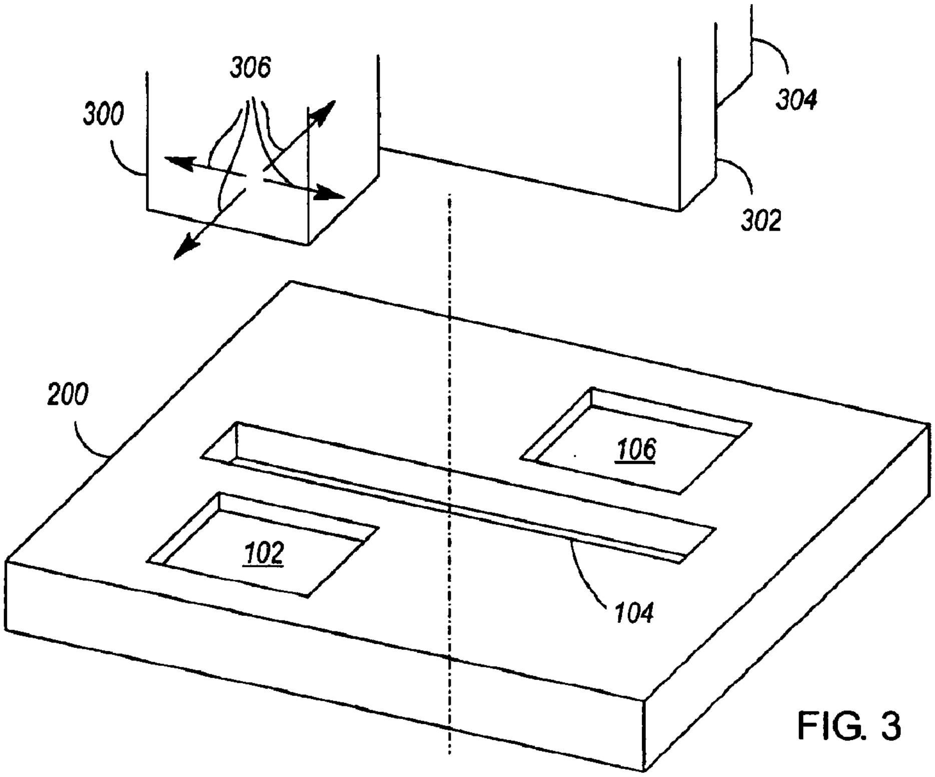
FIG. 3 illustrates the ultrasonic milling of channel plate features in a channel plate.

FIG. 3 illustrates how channel plate features 102–106 such as those illustrated in FIGS. 1 and 2 can be ultrasonically milled in a channel plate 100. The ultrasonic milling process comprises abrading a channel plate 100 with one or more dowels or skids 300–304 that are shaped substantially in the form of channels or other features 102–106 that are to be formed in a channel plate 100. The dowels or skids 302–304 are subjected to ultrasonic vibrations and then brought in contact with the surface of the channel plate 100 so that they abrade the channel plate 100 and remove unwanted material therefrom. If necessary, the channel plate 100 can be sprayed or flooded with a slurry that helps to wash particles, and dissipate heat, from the channel plate 100. Ultrasonic vibrations may cause the dowels or skids 300–304 of a milling machine to move in the directions of arrows 306, as well as in other directions. Since these vibrations will cause the dowels or skids 300–304 of a milling machine to remove material from an area that exceeds the perimeter of the dowels or skids 300–304, it may be desirable to make the dowels or skids 300–304 somewhat smaller than the channels and features 102–106 to which they correspond. A machine that might be used for such a milling process is the AP10-HCV manufactured by Sonic-Mill of Albuquerque, N. Mex., USA. Machines such as this are able to mill a plurality of features 102–106 at once, thereby making ultrasonic milling a parallel feature formation process. Furthermore, ultrasonic milling machines can form features of varying depths at the same time.

Figure 4:
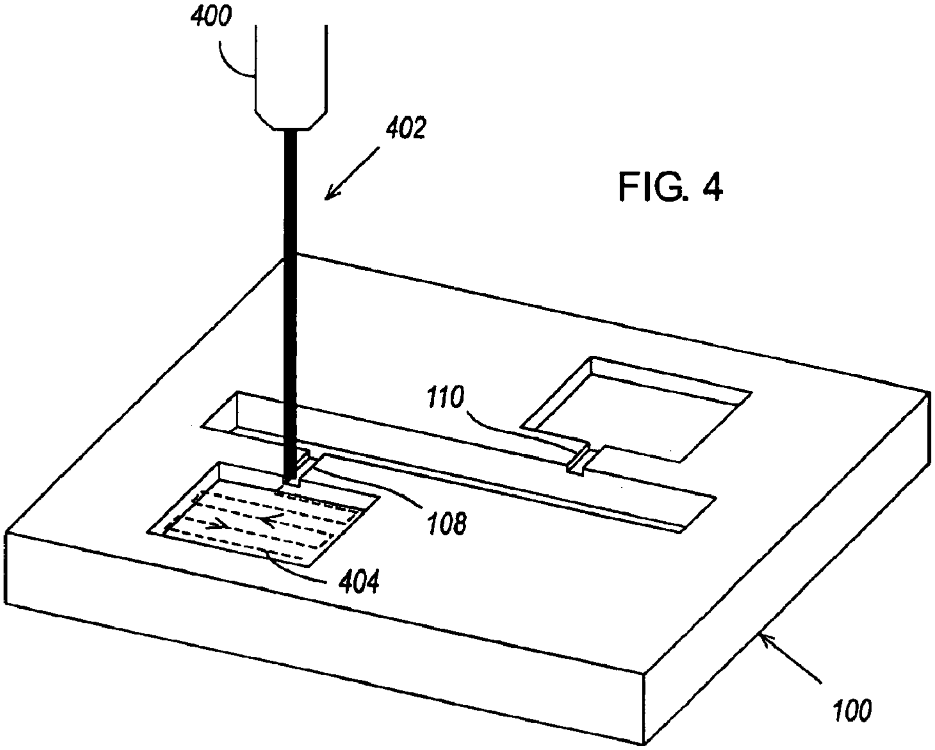
FIG. 4 illustrates the laser cutting of a channel plate feature into a channel plate.

Although it is possible to ultrasonically mill all of a channel plate's features 102–110, it may be desirable to laser cut those features 108, 110 that are smaller than a predetermined size (as well as those that need to be formed within smaller tolerance limits than are achievable through ultrasonic milling). To this end, FIG. 4 illustrates how channel plate features 108, 110 such as those illustrated in FIGS. 1 and 2 can be laser cut into a channel plate 100. To begin, the power of a laser 400 is regulated to control the cutting depth of a laser beam 402. The beam 402 is then moved into position over a channel plate 100 and moved (e.g., in the direction of arrow 404) to cut a feature 108 into the channel plate 100. The laser cutting of channels in a channel plate is further described in the U.S. patent application Ser. No. 10/317,932 of Marvin Glenn Wong entitled "Laser Cut Channel Plate for a Switch" (filed on the same date as this patent application under which is hereby incorporated by reference for all that it discloses.

If the channel plate 100 is formed of glass, ceramic, or polymer, the channel plate 100 may, by way of example, be cut with a YAG laser. An example of a YAG laser is the Nd-YAG laser cutting system manufactured by Enlight Technologies, Inc. of Branchburg, N.J., USA.

As previously discussed, ultrasonically milling features 102–106 in a channel plate 100 is advantageous in that ultrasonic milling machines are relatively fast, and it is possible to mill more than one feature in a single pass (even if the features are of varying depths). Feature tolerances provided by ultrasonic milling are on the order of ±15%. Laser cutting, on the other hand, can reduce feature tolerances to ±3%. Thus, when only minor feature variances can be tolerated, laser cutting may be preferred over milling. It should be noted, however, that the above recited feature tolerances are subject to variance depending on the machine that is used, and the size of the feature to be formed.

In one embodiment of the invention, larger channel plate features (e.g., features 102–106 in FIG. 1) are ultrasonically milled in a channel plate 100, and smaller channel plate features (e.g., features 108 and 110 in FIG. 1) are laser cut into a channel plate 100. In the context of currently available ultrasonic milling and laser cutting machines, it is believed useful to define "larger channel plate features" as those having widths of about 200 microns or greater. Likewise, "smaller channel plate features" may be defined as those having widths of about 200 microns or smaller.

Figure 5:
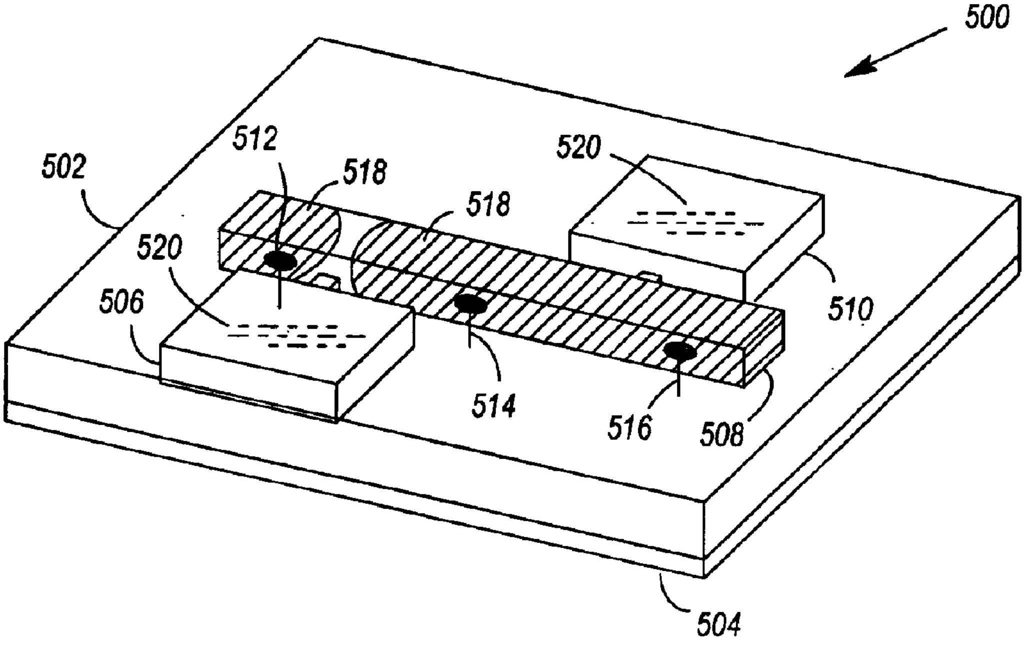
FIG. 5 illustrates a first exemplary embodiment of a switch having a channel plate with laser cut channels therein.

FIG. 5 illustrates a first exemplary embodiment of a switch 500. The switch 500 comprises a channel plate 502 defining at least a portion of a number of cavities 506, 508, 510, a first cavity of which is defined by an ultrasonically milled channel in the channel plate 502. The remaining portions of the cavities 506–510, if any, may be defined by a substrate 504 to which the channel plate 502 is sealed. Exposed within one or more of the cavities are a plurality of electrodes 512, 514, 516. A switching fluid 518 (e.g., a conductive liquid metal such as mercury) held within one or more of the cavities serves to open and close at least a pair of the plurality of electrodes 512–516 in response to forces that are applied to the switching fluid 518. An actuating fluid 520 (e.g., an inert gas or liquid) held within one or more of the cavities serves to apply the forces to the switching fluid 518.

In one embodiment of the switch 500, the forces applied to the switching fluid 518 result from pressure changes in the actuating fluid 520. The pressure changes in the actuating fluid 520 impart pressure changes to the switching fluid 518, and thereby cause the switching fluid 518 to change form, move, part, etc. In FIG. 5, the pressure of the actuating fluid 520 held in cavity 506 applies a force to part the switching fluid 518 as illustrated. In this state, the rightmost pair of electrodes 514, 516 of the switch 500 are coupled to one another. If the pressure of the actuating fluid 520 held in cavity 506 is relieved, and the pressure of the actuating fluid 520 held in cavity 510 is increased, the switching fluid 518 can be forced to part and merge so that electrodes 514 and 516 are decoupled and electrodes 512 and 514 are coupled.

By way of example, pressure changes in the actuating fluid 520 may be achieved by means of heating the actuating fluid 520, or by means of piezoelectric pumping. The former is described in U.S. Pat. No. 6,323,447 of Kondoh et al. entitled "Electrical Contact Breaker Switch, Integrated Electrical Contact Breaker Switch, and Electrical Contact Switching Method", which is hereby incorporated by reference for all that it discloses. The latter is described in U.S. patent application Ser. No. 10/137,691 of Marvin Glenn Wong filed May 2, 2002 and entitled "A Piezoelectrically Actuated Liquid Metal Switch", which is also incorporated by reference for all that it discloses. Although the above referenced patent and patent application disclose the movement of a switching fluid by means of dual push/pull actuating fluid cavities, a single push/pull actuating fluid cavity might suffice if significant enough push/pull pressure changes could be imparted to a switching fluid from such a cavity. In such an arrangement, the channel plate for the switch could be constructed as disclosed herein.

The channel plate 502 of the switch 500 may have a plurality of channels 102–110 formed therein, as illustrated in FIGS. 1–4. In one embodiment of the switch 500, the first channel in the channel plate 502 defines at least a portion of the one or more cavities 508 that hold the switching fluid 518. If this channel is sized similarly to the switching fluid channel 104 illustrated in FIGS. 1 & 2, then it may be preferable to ultrasonically mill this channel in the channel plate 502.

A second channel (or channels) may be formed in the channel plate 502 so as to define at least a portion of the one or more cavities 506, 510 that hold the actuating fluid 520. If these channels are sized similarly to actuating fluid channels 102, 106 illustrated in FIGS. 1 & 2, then it may also be preferable to ultrasonically mill these channels in the channel plate 502.

A third channel (or channels) may be formed in the channel plate 502 so as to define at least a portion of one or more cavities that connect the cavities 506–510 holding the switching and actuating fluids 518, 520. If these channels are sized similarly to the connecting channels 108, 110 illustrated in FIGS. 1 & 2, then it may be preferable to laser cut these channels into the channel plate 502.

Additional details concerning the construction and operation of a switch such as that which is illustrated in FIG. 5 may be found in the aforementioned patent of Kondoh et al. and patent application of Marvin Wong.

Figure 6:
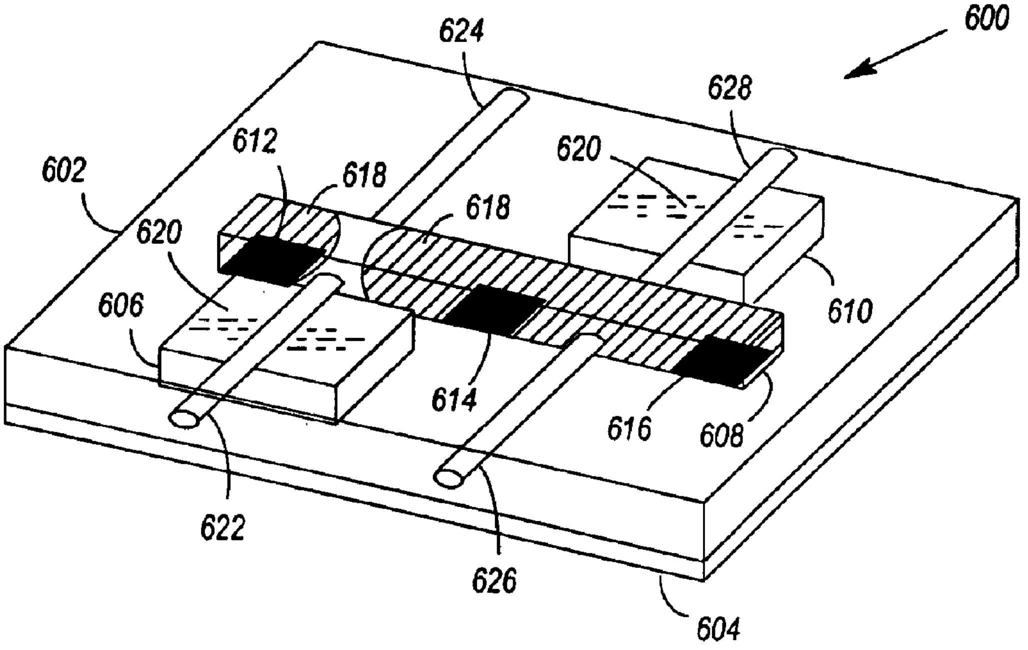
FIG. 6 illustrates a second exemplary embodiment of a switch having a channel plate with laser cut channels therein.

FIG. 6 illustrates a second exemplary embodiment of a switch 600. The switch 600 comprises a channel plate 602 defining at least a portion of a number of cavities 606, 608, 610, a first cavity of which is defined by an ultrasonically milled channel in the channel plate 602. The remaining portions of the cavities 606–610, if any, may be defined by a substrate 604 to which the channel plate 602 is sealed. Exposed within one or more of the cavities are a plurality of wettable pads 612–616. A switching fluid 618 (e.g., a liquid metal such as mercury) is wettable to the pads 612–616 and is held within one or more of the cavities. The switching fluid 618 serves to open and block light paths 622/624, 626/628 through one or more of the cavities, in response to forces that are applied to the switching fluid 618. By way of example, the light paths may be defined by waveguides 622–628 that are aligned with translucent windows in the cavity 608 holding the switching fluid. Blocking of the light paths 622/624, 626/628 may be achieved by virtue of the switching fluid 618 being opaque. An actuating fluid 620 (e.g., an inert gas or liquid) held within one or more of the cavities serves to apply the forces to the switching fluid 618.

Forces may be applied to the switching and actuating fluids 618, 620 in the same manner that they are applied to the switching and actuating fluids 518, 520 in FIG. 5.

The channel plate 602 of the switch 600 may have a plurality of channels 102–110 formed therein, as illustrated in FIGS. 1–4. In one embodiment of the switch 600, the first channel in the channel plate 602 defines at least a portion of the one or more cavities 608 that hold the switching fluid 618. If this channel is sized similarly to the switching fluid channel 104 illustrated in FIGS. 1 & 2, then it may be preferable to ultrasonically mill this channel in the channel plate 602.

A second channel (or channels) may be laser cut into the channel plate 602 so as to define at least a portion of the one or more cavities 606, 610 that hold the actuating fluid 620. If these channels are sized similarly to the actuating fluid channels 102, 106 illustrated in FIGS. 1 & 2, then it may also be preferable to ultrasonically mill these channels in the channel plate 602.

A third channel (or channels) may be laser cut into the channel plate 602 so as to define at least a portion of one or more cavities that connect the cavities 606–610 holding the switching and actuating fluids 618, 620. If these channels are sized similarly to the connecting channels 108, 110 illustrated in FIGS. 1 & 2, then it may be preferable to laser cut these channels into the channel plate 602.

Additional details concerning the construction and operation of a switch such as that which is illustrated in FIG. 6 may be found in the aforementioned patent of Kondoh et al. and patent application of Marvin Wong.

A channel plate of the type disclosed in FIGS. 1 & 2 is not limited to use with the switches 500, 600 disclosed in FIGS. 5 & 6 and may be used in conjunction with other forms of switches that comprise, for example, 1) a channel plate defining at least a portion of a number of cavities, a first cavity of which is defined by an ultrasonically milled channel in the channel plate, and 2) a switching fluid, held within one or more of the cavities, that is movable between at least first and second switch states in response to forces that are applied to the switching fluid.

Figure 7:
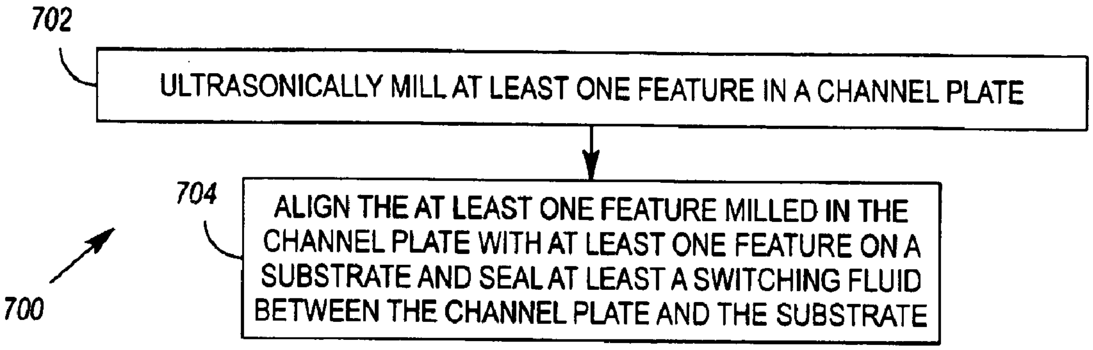
FIG. 7 illustrates an exemplary method for making a fluid-based switch.

An exemplary method 700 for making a fluid-based switch is illustrated in FIG. 7. The method 700 commences with the ultrasonic milling 702 of at least one feature in a channel plate. Optionally, portions of the channel plate may then be metallized (e.g., via sputtering or evaporating through a shadow mask, or via etching through a photoresist). Finally, features formed in the channel plate are aligned with features formed on a substrate, and at least a switching fluid (and possibly an actuating fluid) is sealed 704 between the channel plate and a substrate.

Figure 8:
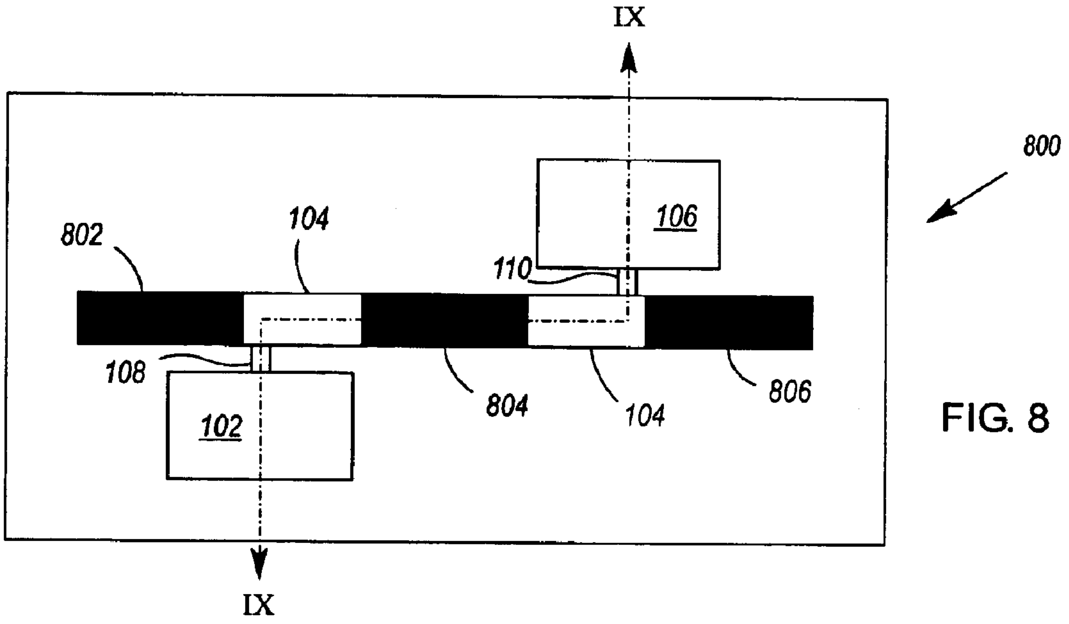
FIGS. 8 & 9 illustrate the metallization of portions of the FIG. 1 channel plate.
Figure 9:
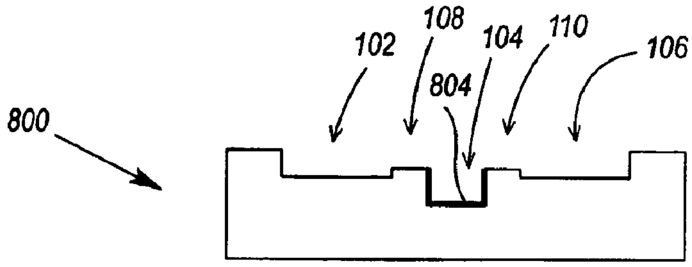

FIGS. 8 & 9 illustrate how portions of a channel plate 800 similar to that which is illustrated in FIGS. 1 & 2 may be metallized for the purpose of creating "seal belts" 802, 804, 806. The creation of seal belts 802–806 within a switching fluid channel 104 provides additional surface to which a switching fluid may wet. This not only helps in latching the various states that a switching fluid can assume, but also helps to create a sealed chamber from which the switching fluid cannot escape, and within which the switching fluid may be more easily pumped (i.e., during switch state changes).

Figure 10:
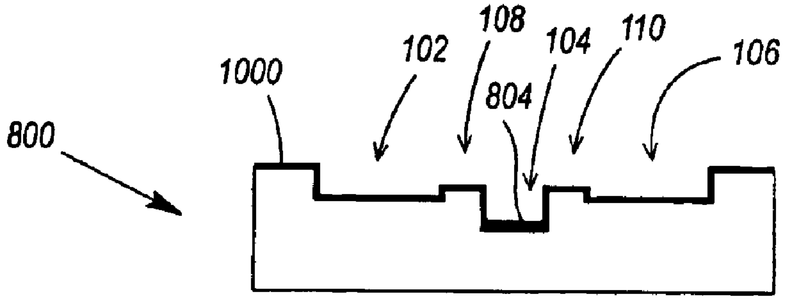
FIG. 10 illustrates the application of an adhesive to the FIG. 9 channel plate.
Figure 11:
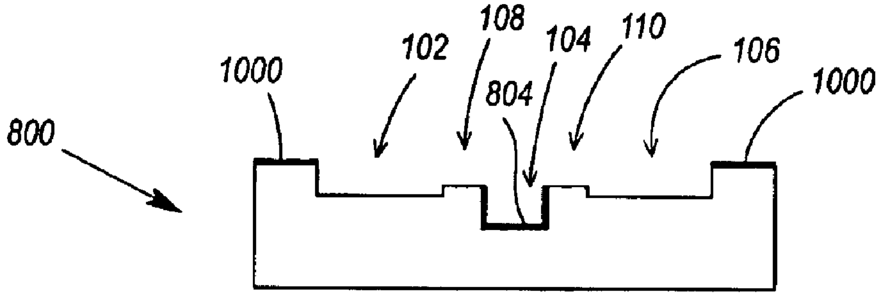
FIG. 11 illustrates the FIG. 10 channel plate after laser ablation of the adhesive from the plate's channels.

One way to seal a switching fluid between a channel plate and a substrate is by means of an adhesive applied to the channel plate. FIGS. 10 & 11 therefore illustrate how an adhesive (such as the Cytop™ adhesive manufactured by Asahi Glass Co., Ltd. of Tokyo, Japan) may be applied to the FIG. 9 channel plate 800. The adhesive 1000 may be spin-coated or spray coated onto the channel plate 800 and cured. Laser ablation may then be used to remove the adhesive from channels and/or other channel plate features (see FIG. 11). If some of the features 108, 110 formed in the channel plate 100 are laser cut into the channel plate 100 then, preferably, the ablation is performed using the same laser 400 that is used for cutting these channels 108, 110, thereby reducing the number of systems that are needed to manufacture a switch that incorporates the channel plate 100.

Although FIGS. 8–11 disclose the creation of seal belts 802–806 on a channel plate 800, followed by the application of an adhesive 1000 to the channel plate 800, these processes could alternately be reversed.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method for making a switch, comprising:

a) ultrasonically milling at least one feature in a channel plate; and b) aligning the at least one feature milled in the channel plate with at least one feature on a substrate and sealing at least a switching fluid between the channel plate and the substrate.

2. The method of claim 1, further comprising:

a) applying an adhesive to the channel plate;

b) laser ablating the adhesive from the at least one feature cut in the channel plate; and c) using the adhesive to seal the switching fluid between the channel plate and the substrate.

3. The method of claim 2, wherein the adhesive is Cytop.

4. The method of claim 2, further comprising laser cutting at least one additional feature into the channel plate.

5. The method of claim 4, wherein the same laser is used for the laser cutting and laser ablating.

6. The method of claim 1, wherein a first feature that is ultrasonically milled in the channel plate is a channel for holding the switching fluid.

7. The method of claim 6, wherein a second feature that is ultrasonically milled in the channel plate is an actuating fluid channel, and wherein the method further comprises sealing an actuating fluid between the channel plate and the substrate.

8. The method of claim 1, wherein the features that are ultrasonically milled in the channel plate comprise a channel for holding the switching fluid and a pair of channels for holding an actuating fluid; the method further comprising:

a) laser cutting a pair of channels connecting corresponding ones of the channels holding the actuating fluid to the channel holding the switching fluid; and b) sealing an actuating fluid between the channel plate and the substrate.

9. The method of claim 1, wherein the at least one ultrasonically milled feature is at least two features of different depths that are milled at the same time.

* * * * *